United States Patent
Liu (10) Patent No.: US 9,984,022 B2
(45) Date of Patent: May 29, 2018

(54) METHOD AND APPARATUS TO IDENTIFY A COMMUNICATION PROTOCOL BEING USED IN A PROCESS CONTROL SYSTEM

(71) Applicant: Bristol, Inc., Houston, TX (US)

(72) Inventor: Xuedong Liu, Avon, CT (US)

(73) Assignee: BRISTOL, INC., Houston, TX (US)

( * ) Notice: Subject to any disclaimer, the term of this patent is extended or adjusted under 35 U.S.C. 154(b) by 23 days.

(21) Appl. No.: 15/214,387

(22) Filed: Jul. 19, 2016

(65) Prior Publication Data

US 2016/0328352 A1 Nov. 10, 2016

Related U.S. Application Data

(63) Continuation of application No. 13/888,020, filed on May 6, 2013, now Pat. No. 9,430,429.
(Continued)

(51) Int. Cl.
*G06F 13/42* (2006.01)
*G06F 13/40* (2006.01)
(Continued)

(52) U.S. Cl.
CPC ........ *G06F 13/385* (2013.01); *G06F 13/4063* (2013.01); *G06F 13/42* (2013.01);
(Continued)

(58) Field of Classification Search
CPC ...... G06F 13/38; G06F 13/382; G06F 13/385; G06F 13/387; G06F 13/40;
(Continued)

(56) References Cited

U.S. PATENT DOCUMENTS

| 4,855,905 A | 8/1989 | Estrada et al. |
| 5,923,557 A | 7/1999 | Eidson |

(Continued)

FOREIGN PATENT DOCUMENTS

| EP | 2306256 | 4/2011 |
| WO | 03013104 | 2/2003 |

(Continued)

OTHER PUBLICATIONS

Patent Cooperation Treaty, "International Preliminary Report on Patentability", issued in connection with PCT Patent Application No. PCT/US2013/039822, dated Nov. 14, 2014, 8 pages.
(Continued)

*Primary Examiner* — Thomas J Cleary
(74) *Attorney, Agent, or Firm* — Hanley, Flight & Zimmerman, LLC (57) ABSTRACT

Methods and apparatus to identify a communication protocol being used in a process control system are disclosed. An example apparatus includes a process control device including a port to be in communication with a bus, the process control device to receive a first signal at the port and a second signal at the port, the process control device including a protocol detector to compare the first signal to reference communication protocols to identify the first signal as being associated with a first communication protocol, the protocol detector to compare the second signal to the reference communication protocols to identify the second signal as being associated with a second communication protocol, the first communication protocol being different than the second communication protocol, the processor to process the first signal based on the first communication protocol and the second signal based on the second communication protocol.

20 Claims, 5 Drawing Sheets

Related U.S. Application Data (60) Provisional application No. 61/643,520, filed on May 7, 2012.

(51) Int. Cl.
    *G06F 13/38*     (2006.01)
    *H04L 29/06*     (2006.01)
    *H04L 29/08*     (2006.01)

(52) U.S. Cl.
    CPC .............. *H04L 67/12* (2013.01); *H04L 69/18* (2013.01); *G06F 13/4226* (2013.01); *G06F 13/4286* (2013.01)

(58) Field of Classification Search
    CPC .............. G06F 13/4004; G06F 13/4027; G06F 13/4063; G06F 13/42; H04L 69/18; H04L 67/12
    See application file for complete search history.

(56) References Cited

U.S. PATENT DOCUMENTS

| | | | |
|---|---|---|---|
| 6,072,803 | A | 6/2000 | Allmond et al. |
| 6,094,600 | A | 7/2000 | Sharpe, Jr. et al. |
| 6,297,691 | B1 | 10/2001 | Anderson et al. |
| 6,889,282 | B2 | 5/2005 | Schollenberger |
| 6,904,476 | B2 | 6/2005 | Hedtke |
| 7,318,112 | B2 | 1/2008 | Park |
| 7,496,671 | B2 | 2/2009 | Engel et al. |
| 7,673,338 | B1 | 3/2010 | Osburn, III et al. |
| 9,083,548 | B2 | 7/2015 | Holmes et al. |
| 9,430,429 | B2 * | 8/2016 | Liu ........................ G06F 13/385 |
| 2002/0167904 | A1 | 11/2002 | Borgeson et al. |
| 2003/0023795 | A1 | 1/2003 | Packwood et al. |
| 2004/0111238 | A1 | 6/2004 | Kantzes et al. |
| 2005/0066045 | A1 | 3/2005 | Johnson et al. |
| 2005/0232305 | A1 * | 10/2005 | Lindemann ............. H04L 69/18 370/489 |
| 2006/0129724 | A1 | 6/2006 | Kostadinov |
| 2006/0282580 | A1 | 12/2006 | Russell, III et al. |
| 2008/0114911 | A1 | 5/2008 | Schumacher |
| 2013/0121346 | A1 * | 5/2013 | Mitchell ............... H04L 69/163 370/465 |
| 2013/0297842 | A1 | 11/2013 | Liu | |

FOREIGN PATENT DOCUMENTS

| | | |
|---|---|---|
| WO | 03025767 | 3/2003 |
| WO | 03039098 | 5/2003 |

OTHER PUBLICATIONS

Patent Cooperation Treaty, "International Search Report", issued in connection with PCT Patent Application No. PCT/US2013/039822, dated Aug. 12, 2013, 5 pages.

Patent Cooperation Treaty, "Written Opinion", issued in connection with PCT Patent Application No. PCT/US2013/039822, dated Aug. 12, 2013, 7 pages.

European Patent Office, "Communication pursuant to Article 94(3) EPC", issued in connection with EP Patent Application No. 13 722 959.7, dated Jan. 13, 2016, 6 pages.

"Hart Protocol—Automate process industry", Jul. 28, 2011, [https://learnprotocols.wordpress.com/2011/07/28/hart-protocol/], retrieved on Dec. 22, 2015, 11 pages.

Emerson Process Management, "3808 MVT Multivariable Transmitter", Product Data Document 225DS-26J/D301301X012, Jun. 2013, 13 pages.

Emerson Process Management, "MVS205 Multi-Variable Sensor", Product Data Sheet MVS205/D30179X012, Oct. 2013, 7 pages.

Emerson Process Management, "Rosemount 3051S MultiVariable Transmitter", Reference Manual 00809-0100-4738, Rev DA, May 2006, 188 pages.

Emerson Process Management, "Rosemount 3095FB MultiVariable Transmitter with Modbus Protocol", Reference Manual 00809-0100-4738, Rev DA, May 2006, 170 pages.

United States Patent and Trademark Office, "Non-Final Office Action," issued in connection with U.S. Appl. No. 13/888,020, dated Jul. 8, 2015, 47 pages.

United States Patent and Trademark Office, "Final Office Action," issued in connection with U.S. Appl. No. 13/888,020, dated Nov. 3, 2015, 53 pages.

United States Patent and Trademark Office, "Notice of Allowance," issued in connection with U.S. Appl. No. 13/888,020, dated Jan. 25, 2016, 65 pages.

United States Patent and Trademark Office, "Notice of Allowance," issued in connection with U.S. Appl. No. 13/888,020, dated Apr. 28, 2016, 16 pages.

Thomas, "Introduction to the Modbus Serial and Modbus TCP," The Extension, Sep.-Oct. 2008, Contemporary Control Systems, Inc., 5 pages.

Acromag, Inc., "Introduction to MODBUS TCP/IP," 2005, 41 pages.

Emerson Process Management, "Bristol Standard Asynchronous/Synchronous Protocol," Product Data Document 454ds-6a, Emerson Process Management, Aug. 31, 2007, 6 pages.

Bristol Babcock, "Network 3000 Communications Configuration Guide," D5080 Issue: Apr. 2001, 168 pages.

Bristol Babcock, "Engineering Report No. 95-001," Bristol Babcock Interfacing, Engineering Report, Apr. 17, 1996, 4 pages.

Automation.com, "Essex introduces KTP RS-485 keypad," May 1, 2008, retrieved from Internet Oct. 9, 2015, [http://www.automation.com/product-showcase/essex-introduces-ktp-rs-485-keypad], 8 pages.

Modicon, Inc., "Modicon Modbus Protocol Reference Guide," Revision J. PI-MBUS-300, Jun. 1996, 121 pages.

Unknown, "Introduction to MODBUS Technical Tutorial," Dec. 6, 2002, 10 pages.

Honeywell, Inc., "Communication Link Module Bristol Babcock/RTU Interface Specification and Technical Data," LK03-100,1993, 8 pages.

"MODUS Application Protocol Specification," Version 1.1 b, Modbus-IDA, Dec. 28, 2006, 51 pages.

"HART-710 User's Manual," Version 1.00, Jul. 2010, ICP DAS, 68 pages.

Emerson Process Management, "Network 3000 Communications Application Programmer's Reference," Reference D4052, Oct. 2007, 279 pages.

MODBUS.org, "MODBUS over Serial Line Specification & Implementation Guide," Version 1.0, Dec. 12, 2002, 44 pages.

\* cited by examiner

FIG. 9

METHOD AND APPARATUS TO IDENTIFY A COMMUNICATION PROTOCOL BEING USED IN A PROCESS CONTROL SYSTEM

RELATED APPLICATIONS

This patent arises from a continuation of U.S. patent application Ser. No. 13/888,020, filed May 6, 2013, which claims priority to U.S. Provisional Application No. 61/643,520, filed May 7, 2012. Priority is claimed to U.S. patent application Ser. No. 13/888,020 and U.S. Provisional Application No. 61/643,520. U.S. patent application Ser. No. 13/888,020 and to U.S. Provisional Application No. 61/643,520 are hereby incorporated herein by reference in their entireties.

FIELD OF THE DISCLOSURE

The disclosure relates generally to process control and, more particularly, methods and apparatus to identify a communication protocol being used in a process control system.

BACKGROUND

Process control devices collect data and/or control equipment in process control environments. The process control devices are provided with communications capabilities to enable remote configuration, control, and/or data reporting for the process control devices.

SUMMARY

An example apparatus includes a process control device including a port to be in communication with a bus, the process control device to receive a first signal at the port and a second signal at the port, the process control device including a protocol detector to compare the first signal to reference communication protocols to identify the first signal as being associated with a first communication protocol, the protocol detector to compare the second signal to the reference communication protocols to identify the second signal as being associated with a second communication protocol, the first communication protocol being different than the second communication protocol, the processor to process the first signal based on the first communication protocol and the second signal based on the second communication protocol.

DETAILED DESCRIPTION

Although the following discloses example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

In process control systems, devices such as variable transmitters synchronize and communicate with central control systems to provide data on each segment of a production line. Hosts are provided with different communication protocols, such as HART, MODBUS, and/or BSAP, to name a few.

Example methods and apparatus described herein enable process control devices to communicate with multiple process control hosts and/or simultaneous multiple protocol communication without user configuration of the protocols. Example methods and apparatus increase product flexibility and free users (e.g., installers, technicians) from having to memorize which protocol is to be configured on which port of a process control device. Furthermore, the example methods and apparatus permit communications with a process control device to be changed between different protocols without additional user configuration of the process control device to ensure interoperability. Thus, the example methods and apparatus disclosed herein reduce installation, configuration, and/or training costs for process control devices.

Figure 1:
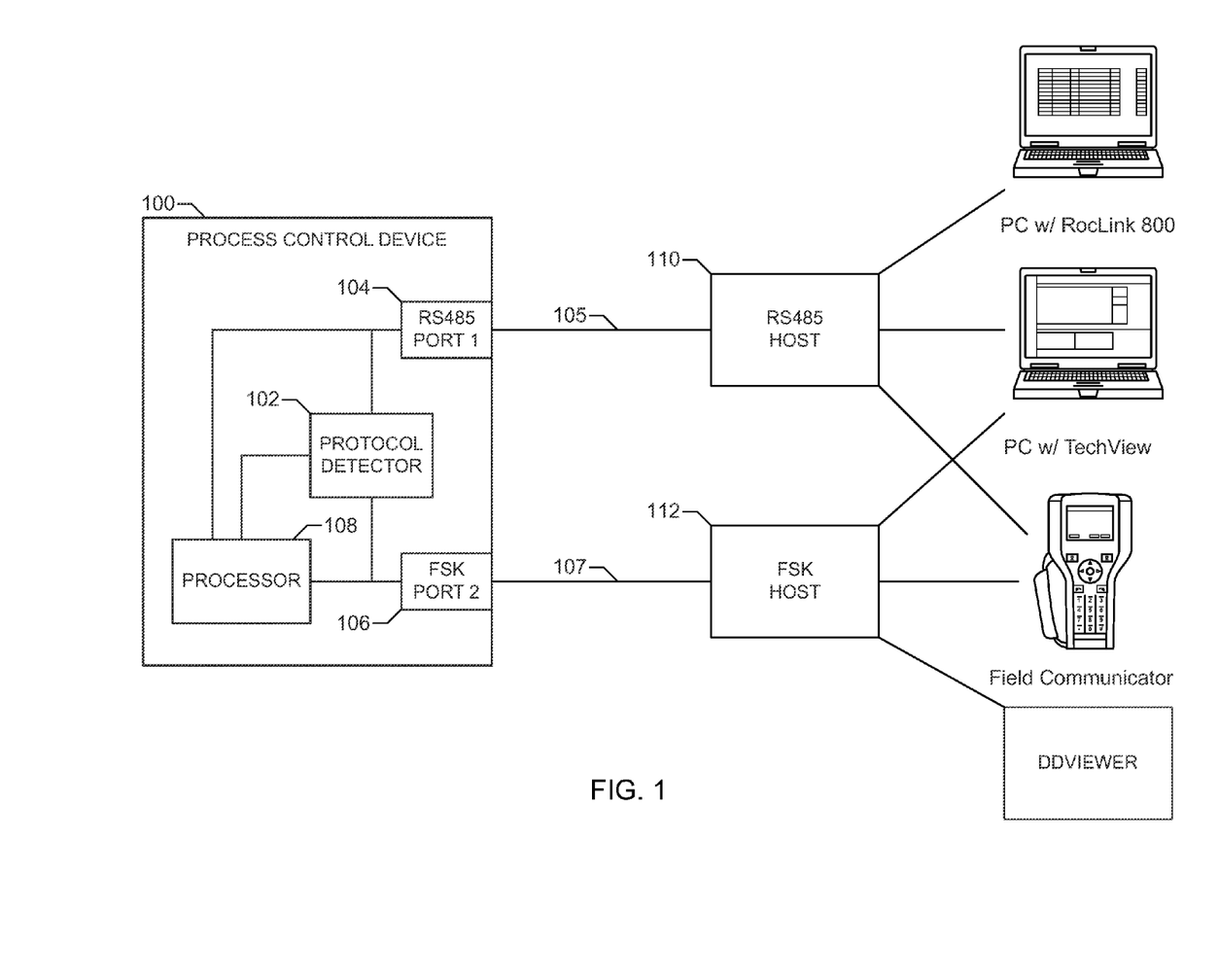
FIG. 1 is a block diagram of an example process control device including a protocol detector.

FIG. 1 is a block diagram of an example process control device 100 including a protocol detector 102. As used herein, the term process control device 100 includes any device that may be used to control, sense, measure, communicate, and/or otherwise interact with a process control system such as a manufacturing, industrial, and/or commercial process control systems. The example process control device 100 may be any type of process control device, such as a multivariable pressure transmitter that measures a fluid or gas pressure, converts the measurement to an electronic representation, and transmits the measurement to another controller or device for processing and/or storage.

The example process control device 100 includes two ports 104, 106. The example port 104 is configured to communicate over an RS485 bus 105. In contrast, the example port 106 is configured to communicate over a Frequency Shift Keying (FSK) bus 107. The example process control device 100 includes a processor 108 (or other type of logic circuit) to receive and/or transmit commands and/or data via the ports 104, 106. The example port 104 is communicatively coupled to an RS485 host 110, and the example port 106 is communicatively coupled to an FSK host 112. The process control device 100 of FIG. 1 may communicate with either of the example host devices 110, 112 via the respective buses 105, 107.

The example RS485 host 110 may be, for example, a personal computer executing RocLink 800 software from Emerson Process Control, a personal computer executing TechView software from Emerson Process Control, a Field Communicator from Emerson Process Control, and/or any other device capable of communicating via the RS485 bus 105. The example FSK host 112 may be, for example, a personal computer executing TechView software, a Field Communicator, a personal computer executing DD Viewer software from Emerson Process Control, and/or any other device capable of communicating via the FSK bus 107.

Different types of communication protocols are used in different process control systems and/or environments. Each type of communication protocol offers advantages and disadvantages, and/or is better suited for a particular configuration of devices. RS485 buses are often used to communicate via the MODBUS protocol or the Bristol Standard Asynchronous Protocol (BSAP). The example port 104 of FIG. 1 is configured to communicate using the MODBUS and/or the BSAP protocols. FSK buses are often used to communicate via the BSAP protocol, the MODBUS protocol, and/or the Highway Addressable Remote Transducer (HART) protocol. The example port 106 of FIG. 1 is configured to communicate via the BSAP, MODBUS, and HART protocols.

The example processor 108 is also capable of transmitting and/or receiving via the BSAP, MODBUS, and HART protocols. The example RS485 host 110 may transmit packets to the example device 100 via the port 104 in one of multiple communication protocols. Similarly, the example FSK host 112 may transmit packets to the example device 100 via the port 106 in one of multiple communication protocols. In contrast to known process control devices, which are configured for a particular protocol on a particular port by the user (e.g., technician, installer), the example device 100 automatically detects which of the usable communication protocols is being transmitted to the device 100 via the ports 104, 106. This configuration is usually performed when the device is first initialized based on the communication capabilities of the hosts and/or buses to which the device is connected.

To facilitate communication via one or more protocols, the example protocol detector 102 of FIG. 1 detects which of the communication protocols is used on incoming messages. For example, the protocol detector 102 of FIG. 1 may identify a communication protocol based on a packet received via one of the ports 104, 106 when the device 100 is first initialized and/or when a received packet does not match an expected communication protocol.

To identify a protocol, the example protocol detector 102 compares the structure, length, and/or contents of a packet received via a port 104, 106 with one or more protocol message structures. The example protocol detector 102 may positively identify (e.g., by matching to a protocol) or negatively identify (e.g., by eliminating other protocols) which protocol is being used. One or more communication protocols may have conclusive factors that, on observance, cause the protocol detector 102 to determine that the communication protocol is being used (or is not being used).

Additionally or alternatively, one or more communication protocols may have one or more sets of factors that, when observed in combination, cause the protocol detector 102 to determine that the communication protocol is being used (or is not being used). Example protocol message structures and example messages are described below with reference to FIGS. 2-7.

On identifying which communication protocol matches the received message, the example protocol detector 102 informs the processor 108 of the communication protocol and the port 104, 106 on which the message was received. The example processor 108 then processes the received message and future received messages according to the determined protocol. Furthermore, the example processor 108 obeys the conventions of the determined protocol and generates outgoing messages according to the determined protocol.

While the example protocol detector 102 of FIG. 1 is illustrated as a separate block, the protocol detector 102 may be implemented as a part of the example processor 108.

Figure 2:
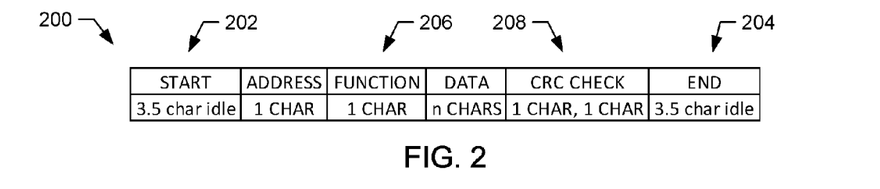
FIG. 2 illustrates an example MODBUS protocol message structure that may be used by the protocol detector of FIG. 1 to detect MODBUS protocol communications.
Figure 3:
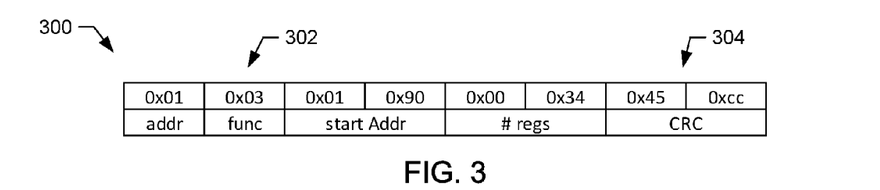
FIG. 3 illustrates an example message conforming to the MODBUS protocol that is identifiable by the protocol detector of FIG. 1 as a MODBUS message.

FIG. 2 illustrates an example MODBUS protocol message structure 200 that may be used by the protocol detector 102 of FIG. 1 to detect MODBUS protocol communications. FIG. 3 illustrates an example message 300 conforming to the MODBUS protocol that is identifiable by the protocol detector 102 of FIG. 1 as a MODBUS message. The example protocol detector 102 of FIG. 1 may detect that the example MODBUS message 300 conforms to the MODBUS protocol (as opposed to the HART or BSAP protocols) by observing one or more of, for example: 1) start and/or end intervals 202, 204; 2) a function byte 302 corresponding to a function field 206; and/or 3) two cyclical redundancy check (CRC) bytes 304 corresponding to a CRC field 208.

Figure 4:
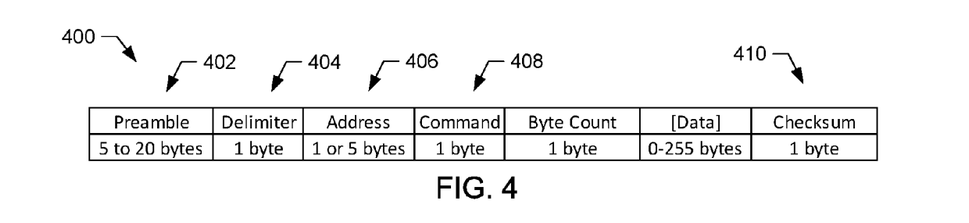
FIG. 4 illustrates an example HART protocol message structure that may be used by the protocol detector of FIG. 1 to detect HART protocol communications.
Figure 5:
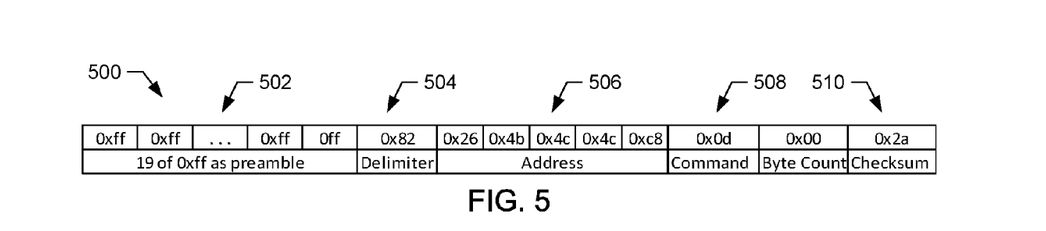
FIG. 5 illustrates an example message conforming to the HART protocol that is identifiable by the protocol detector of FIG. 1 as a HART message.

FIG. 4 illustrates an example HART protocol message structure 400 that may be used by the protocol detector 102 of FIG. 1 to detect HART protocol communications. FIG. 5 illustrates an example message 500 conforming to the HART protocol that is identifiable by the protocol detector 102 of FIG. 1 as a HART message. The example protocol detector 102 of FIG. 1 may detect that the example HART message 500 conforms to the HART protocol (as opposed to the MODBUS or BSAP protocols) by observing one or more of: 1) a 5-20 byte preamble 502 of 0xff bytes corresponding to preamble field 402; 2) a delimiter byte 504 corresponding to a delimiter field 404; 3) a 5-byte address 506 corresponding to an address field 406; 4) a command byte 508 corresponding to a command field 408; and/or 5) a checksum byte 510 corresponding to a checksum field 410.

Figure 6A:
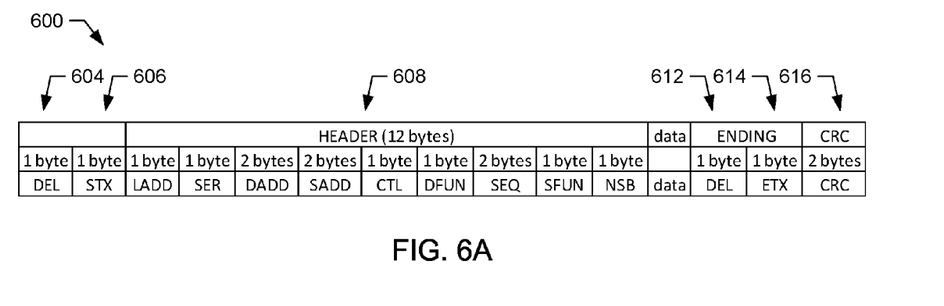
FIG. 6A illustrates a first example BSAP protocol message structure 600 that may be used by the protocol detector of FIG. 1 to detect BSAP protocol communications.
Figure 6B:
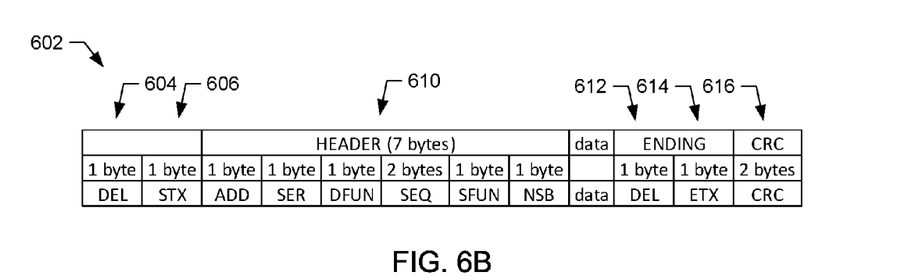
FIG. 6B illustrates a second example BSAP protocol message structure 600 that may be used by the protocol detector of FIG. 1 to detect BSAP protocol communications.
Figure 7:
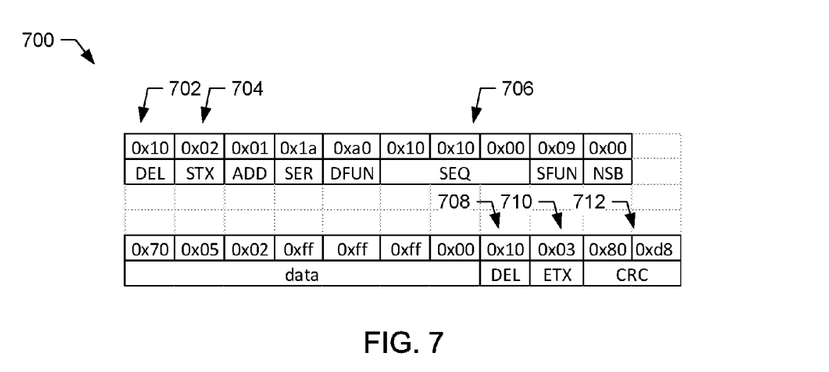
FIG. 7 illustrates an example message conforming to the BSAP protocol that is identifiable by the protocol detector of FIG. 1 as a BSAP message.

FIG. 6A illustrates a first example BSAP protocol message structure 600 that may be used by the protocol detector 102 of FIG. 1 to detect BSAP protocol communications. FIG. 6B illustrates a second example BSAP protocol message structure 602 that may be used by the protocol detector 102 of FIG. 1 to detect BSAP protocol communications. FIG. 7 illustrates an example message 700 conforming to the BSAP protocol that is identifiable by the protocol detector of FIG. 1 as a BSAP message. The example protocol detector 102 of FIG. 1 may detect that the example BSAP message 700 conforms to the BSAP protocol (as opposed to the MODBUS or HART protocols) by observing one or more of: 1) a data link escape (DEL) byte 702 corresponding to a DEL field 604; 2) a start text (STX) byte 704 corresponding to a start text field 606; 3) 7 or 12 header bytes 706 corresponding to a 12-byte header field 608 or a 7-byte header field 610; 4) a second DEL byte 708 corresponding to a second DEL field 612; 5) an end text (ETX) byte 710 corresponding to an ETX field 614; and/or 6) two CRC bytes 712 corresponding to a 2-byte CRC field 616.

While an example manner of implementing the protocol detector 102 has been illustrated in FIG. 1, one or more of the elements, processes and/or devices illustrated in FIG. 1 may be combined, divided, re-arranged, omitted, eliminated and/or implemented in any other way. Further, the example protocol detector 102 and/or, more generally, the example device 100 of FIG. 1 may be implemented by hardware, software, firmware and/or any combination of hardware, software and/or firmware. Thus, for example, the example protocol detector 102 and/or, more generally, the example process control device 100 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. Further still, the example protocol detector 102 of FIG. 1 may include one or more elements, processes and/or devices in addition to, or instead of, those illustrated in FIG. 1, and/or may include more than one of any or all of the illustrated elements, processes and devices.

Figure 8:
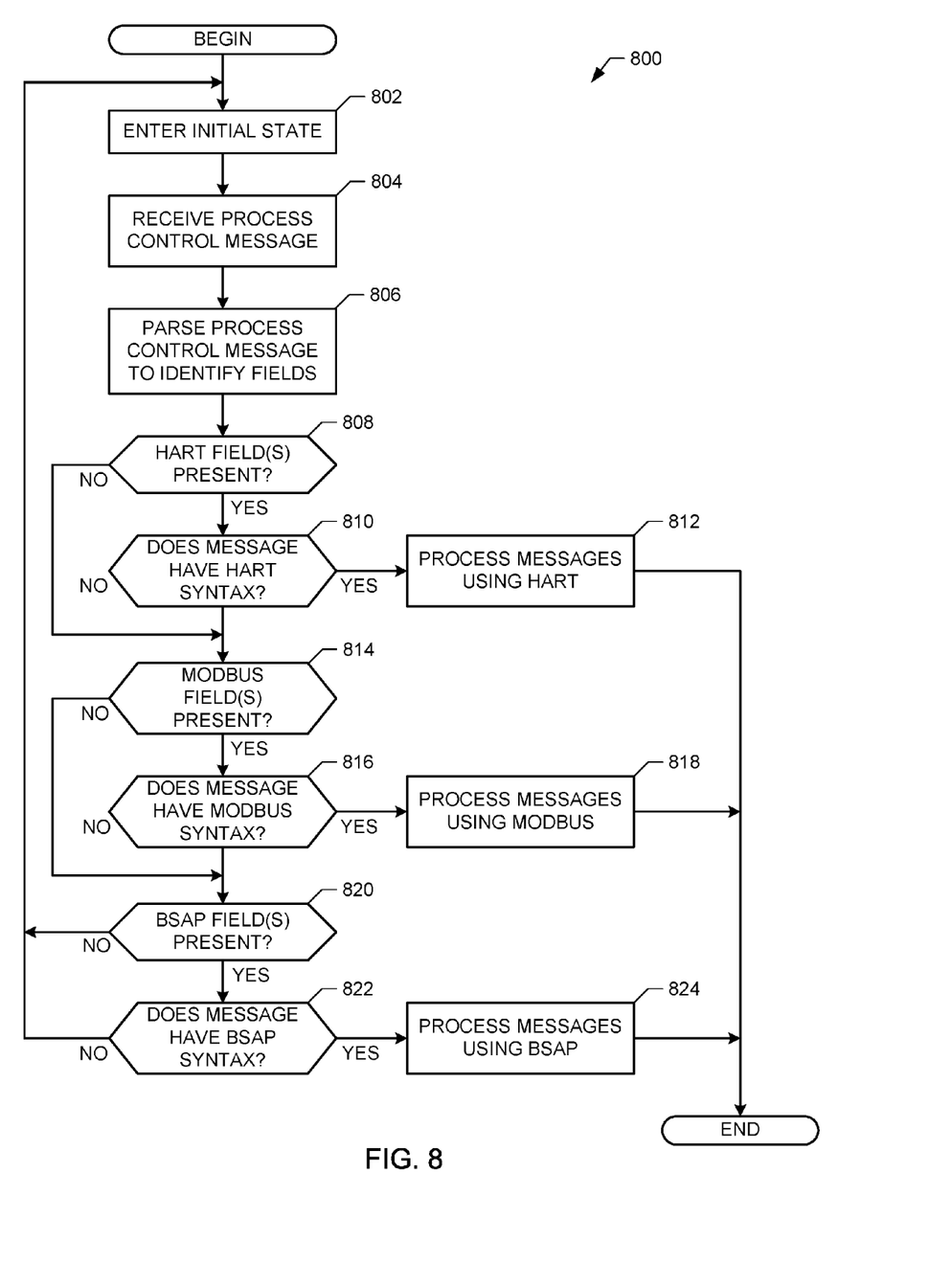
FIG. 8 is a flowchart representative of an example method to detect a message protocol.

A flowchart representative of an example method 800 for implementing the example protocol detector 102 and/or the example processor 108 of FIG. 1 is shown in FIG. 8. In this example, the example method 800 may be implemented using machine readable instructions comprise a program for execution by a processor such as the processor 912 shown in the example computer 900 discussed below in connection with FIG. 9. The program may be embodied in software stored on a tangible computer readable medium such as a computer readable storage medium (e.g., a CD-ROM, a floppy disk, a hard drive, a digital versatile disk (DVD), a Blu-ray disk, or a memory associated with the processor 912), but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example protocol detector 102 may alternatively be used. For example, the order of execution of the blocks may be changed, and/or some of the blocks described may be changed, eliminated, or combined.

As mentioned above, the example method 800 of FIG. 8 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example method 800 of FIG. 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information).

The example method 800 may be performed by the example protocol detector 102, the example processor 108 and/or, more generally, the example process control device 100 of FIG. 1. The method 800 of FIG. 8 may be performed when, for example, the process control device 100 is initialized and/or a host device (e.g., the hosts 110, 112) is plugged into a port (e.g., the ports 104, 106) of the example process control device 100. In some other examples, the method 800 is performed by the protocol detector 102 in response to receiving one or more messages that do not conform to an expected protocol.

The example method 800 begins by entering an initial state (block 802). In the example initial state, the protocol detector 102 and/or the processor 108 are not configured to process messages according to any particular protocol. At some time, the example protocol detector 102 receives (e.g., via the ports 104, 106) a process control message (block 804). The example protocol detector 102 parses the process control message to identify one or more fields (block 806).

The protocol detector 102 determines whether any HART protocol fields are present (block 808). For example, the protocol detector 102 may determine whether the message includes one or more of: 1) a 5-20 byte preamble of 0xff bytes (e.g., the preamble field 502 of FIG. 5) corresponding to preamble field (e.g., the preamble field 402 of FIG. 4); 2) a delimiter byte (e.g., the delimiter byte 504) corresponding to a delimiter field (e.g., the delimiter field 404); 3) a 5-byte address (e.g., the address 506) corresponding to an address field (e.g., the address field 406); 4) a command byte (e.g., the command byte 508) corresponding to a command field (e.g., the command field 408); and/or 5) a checksum byte (e.g., the checksum byte 510) corresponding to a checksum field (e.g., the checksum field 410). If there are HART fields present (block 808), the example protocol detector 102 determines whether the message conforms to the HART syntax (e.g., message protocol) (block 810). If the message has the HART syntax (block 810), the example protocol detector 102 instructs the processor 108 to process messages using the HART protocol (block 812).

If there are no HART fields present (block 808) or if the message does not have a proper HART syntax (block 810), the example protocol detector 102 determines whether any MODBUS protocol fields are present (block 814). For example, the protocol detector 102 may determine whether the message includes one or more of: 1) start and/or end intervals (e.g., start and/or end intervals 202, 204 of FIG. 2); 2) a function byte (e.g., the function byte 302 of FIG. 3) corresponding to a function field (e.g., the function field 206); and/or3) two CRC bytes (e.g., the CRC bytes 304) corresponding to a CRC field (e.g., the CRC field 208). If there are MODBUS fields present (block 814), the example protocol detector 102 determines whether the message conforms to the MODBUS syntax (e.g., message protocol) (block 816). If the message has the MODBUS syntax (block 816), the example protocol detector 102 instructs the processor 108 to process messages using the MODBUS protocol (block 818).

If there are no MODBUS fields present (block 814) or if the message does not have a proper MODBUS syntax (block 816), the example protocol detector 102 determines whether any BSAP protocol fields are present (block 820). For example, the protocol detector 102 may determine whether the message includes one or more of: 1) a data link escape (DEL) byte (e.g., the DEL byte 702 of FIG. 7) corresponding to a DEL field (e.g., the DEL fields 604 of FIGS. 6A and 6B); 2) a start text (STX) byte (e.g., the STX byte 704) corresponding to a start text byte (e.g., the STX bytes 606); 3) 7 or 12 header bytes (e.g., the header bytes 706) corresponding to a 12-byte header field (e.g., the header field 608 of FIG. 6A) or a 7-byte header field (e.g., the header field 610 of FIG. 6A); 4) a second DEL byte (e.g., the DEL byte 708) corresponding to a second DEL field (e.g., the DEL fields 612); 5) an end text (ETX) byte (e.g., the ETX byte 710) corresponding to an ETX field (e.g., the ETX fields 614); and/or 6) two CRC bytes (e.g., the CRC bytes 712) corresponding to a 2-byte CRC field (e.g., the CRC field 616). If there are BSAP fields present (block 820), the example protocol detector 102 determines whether the message conforms to the BSAP syntax (e.g., message protocol) (block 822). If the message has the BSAP syntax (block 822), the example protocol detector 102 instructs the processor 108 to process messages using the BSAP protocol (block 824).

If the protocol detector 102 determines that the message does not have any of the syntaxes (blocks 810, 816, 822), the example method 800 returns to block 802 to remain in the initial state. If, however, the example protocol detector 102 causes the processor 108 to process messages using HART (block 812), using MODBUS (block 818), or using BSAP (block 824), the example protocol detector 102 may end the example method 800.

Figure 9:
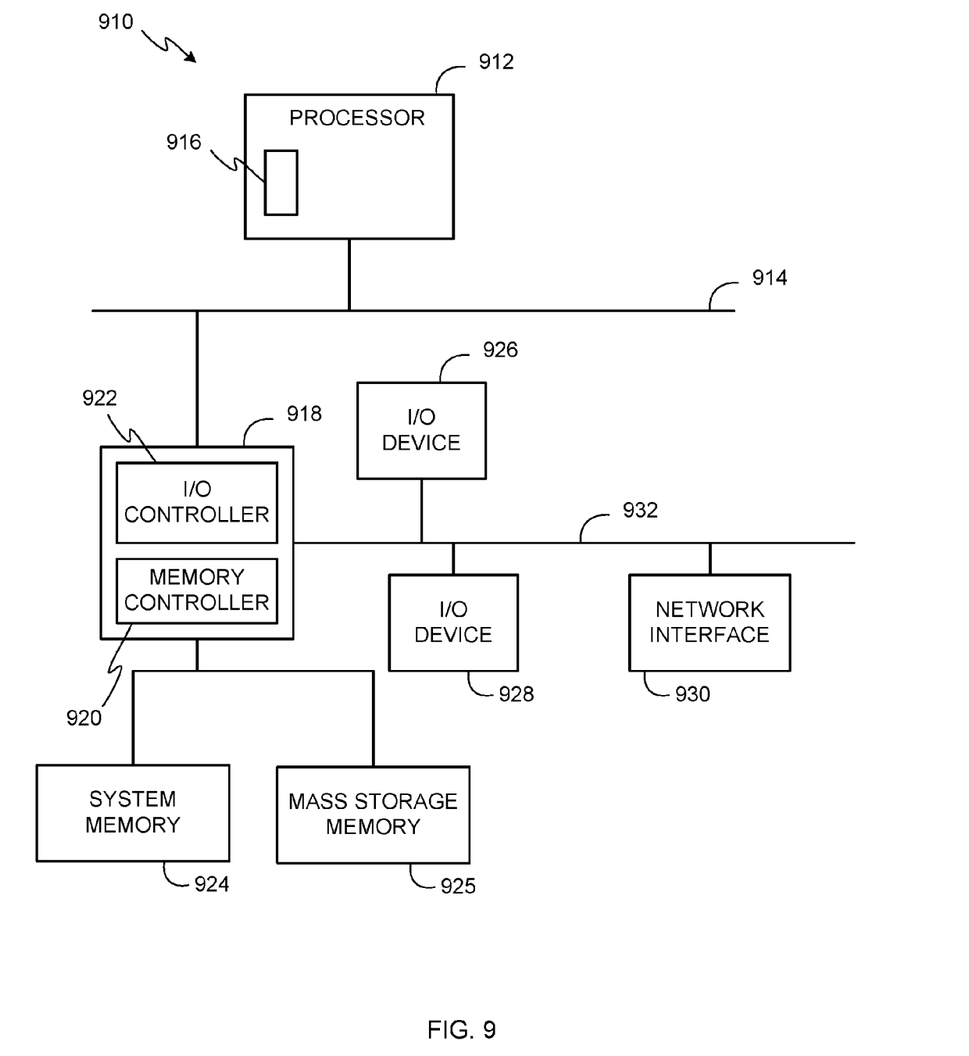
FIG. 9 is a block diagram of an example processor system that may be used to implement the example protocol detector of FIG. 1.

FIG. 9 is a block diagram of an example processor system 910 that may be used to implement the example protocol detector 102, the example process control device 100, the example RS485 host 110, and/or the example FSK host 112 of FIG. 1. As shown in FIG. 9, the processor system 910 includes the processor 912 (e.g., the processor 108) that is coupled to an interconnection bus 914. The processor 912 includes a register set or register space 916, which is depicted in FIG. 9 as being entirely on-chip, but which could alternatively be located entirely or partially off-chip and directly coupled to the processor 912 via dedicated electrical connections and/or via the interconnection bus 914. The processor 912 may be any suitable processor, processing unit or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and an input/output (I/O) controller 922. As is well known, a chipset typically provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 929.

The system memory 924 may include any desired type of volatile and/or non-volatile memory such as, for example, static random access memory (SRAM), dynamic random access memory (DRAM), flash memory, read-only memory (ROM), etc. The mass storage memory 929 may include any desired type of mass storage device including hard disk drives, optical drives, tape storage devices, etc.

The I/O controller 922 performs functions that enable the processor 912 to communicate with peripheral input/output (I/O) devices 926 and 928 and a network interface 930 via an I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode (ATM) device, an 802.11 device, a DSL modem, a cable modem, a cellular modem, etc. that enables the processor system 910 to communicate with another processor system.

While the memory controller 920 and the I/O controller 922 are depicted in FIG. 9 as separate functional blocks within the chipset 918, the functions performed by these blocks may be integrated within a single semiconductor circuit or may be implemented using two or more separate integrated circuits.

An example method includes determining that the process control system message received via a port has a message structure corresponding to a first one of a plurality of process control message protocols; and processing the process control message according to the first process control message protocol. In some examples, the first one of the plurality of process control message protocols corresponds to one of a Highway Addressable Remote Transducer protocol, a MODBUS protocol, or a Bristol Standard Asynchronous Protocol. In some examples, the method includes parsing the process control message to identify a message field of the process control message; matching the content of the message field to a known field of the message structure corresponding to the first one of the plurality of process control message protocols.

In some examples, the method includes determining that the message structure corresponds to a Highway Addressable Remote Transducer protocol if the content of the message field comprises a five-twenty byte preamble of 0xff bytes when the known field corresponds to a preamble field. In some examples, the method includes determining that the message structure corresponds to a Highway Addressable Remote Transducer protocol if the content of the message field comprises a delimiter byte when the known field corresponds to a delimiter field. In some examples, the method includes determining that the message structure corresponds to a Highway Addressable Remote Transducer protocol if the content of the message field comprises a five-byte address when the known field corresponds to an address.

In some examples, the method includes determining that the message structure corresponds to a Highway Addressable Remote Transducer protocol if the content of the message field comprises a command byte when the known field corresponds to a command field. In some examples, the method includes determining that the message structure corresponds to a Highway Addressable Remote Transducer protocol if the content of the message field comprises a single checksum byte when the known field corresponds to a checksum field. In some examples, the method includes determining that the message structure corresponds to a MODBUS protocol if the content of the message field comprises data associated with a start interval or an end interval when the known field corresponds to a start interval or an end interval.

In some examples, the method includes determining that the message structure corresponds to a MODBUS protocol if the content of the message field comprises a function byte when the known field corresponds to a function field. In some examples, the method includes determining that the message structure corresponds to a Bristol Standard Asynchronous Protocol if the content of the message field comprises seven or twelve header bytes when the known field corresponds to a seven-byte or a twelve-byte header field. In some examples, the method includes determining that the message structure corresponds to a Bristol Standard Asynchronous Protocol if the content of the message field comprises a data link escape byte when the known field corresponds to a data link escape field.

In some examples, the method includes determining that the message structure corresponds to a Bristol Standard Asynchronous Protocol if a second content of a second message field comprises a second data link escape byte when the known field corresponds to a second data link escape field. In some examples, the method includes determining that the message structure corresponds to a Bristol Standard Asynchronous Protocol if the content of the message field comprises a start text byte when the known field corresponds to a start text field. In some examples, the method includes determining that the message structure corresponds to a Bristol Standard Asynchronous Protocol if the content of the message field comprises an end text byte when the known field corresponds to an end text field. In some examples, the method includes determining that the message structure corresponds to one of a MODBUS protocol or a Bristol Standard Asynchronous Protocol if the content of the message field comprises two cyclical redundancy check bytes when the known field corresponds to a two-byte cyclical redundancy check field. In some examples, the port is configured to communicate over one of an RS485 bus or a Frequency Shift Keying bus.

An example apparatus includes a port to receive a process control message; a protocol detector to determine that the process control system message has a message structure corresponding to a first one of a plurality of process control message protocols; and a processor to process the process control message according to the first process control message protocol. In some examples, the first one of the plurality of process control message protocols corresponds to one of a Highway Addressable Remote Transducer protocol, a MODBUS protocol, or a Bristol Standard Asynchronous Protocol. In some examples, the protocol detector is to determine that the message structure of the process control message corresponds to a Highway Addressable Remote Transducer protocol if the content of a message field of the process control message comprises at least one of: a five-twenty byte preamble of 0xff bytes when the known field corresponds to a preamble field, a delimiter byte when the known field corresponds to a delimiter field, a five-byte address when the known field corresponds to an address, a command byte when the known field corresponds to a command field, or a single checksum byte when the known field corresponds to a checksum field.

In some examples, the protocol detector is to determine that the message structure of the process control message corresponds to a MODBUS protocol if the content of a message field of the process control message comprises at least one of: data associated with a start interval when the known field corresponds to a start interval, data associated with an end interval when the known field corresponds to an end interval, a function byte when the known field corresponds to a function field, or two cyclical redundancy check bytes when the known field corresponds to a cyclical redundancy check field. In some examples, the protocol detector is to determine that the message structure of the process control message corresponds to a Bristol Standard Asynchronous Protocol if the content of a message field of the process control message comprises at least one of: a data link escape byte when the known field corresponds to a data link escape field, a start text byte when the known field corresponds to a start text field, seven header bytes when the known field corresponds to a seven-byte header field, twelve header bytes when the known field corresponds to a twelve-byte header field, a second data link escape byte when the known field corresponds to a second data link escape field, an end text byte when the known field corresponds to an end text field, or two cyclical redundancy check bytes when the known field corresponds to a two-byte cyclical.

An example tangible machine readable storage medium comprising machine readable instructions, which when executed, cause a machine to at least: receiving a process control message via a port; determining that the process control system message has a message structure corresponding to a first one of a plurality of process control message protocols; and processing the process control message according to the first process control message protocol. In some examples, the instructions are further to cause the machine to determine that the message structure corresponds to a Highway Addressable Remote Transducer protocol if the content of the message field of the process control message comprises at least one of: a five-twenty byte preamble of 0xff bytes when the known field corresponds to a preamble field, a delimiter byte when the known field corresponds to a delimiter field, a five-byte address when the known field corresponds to an address, a command byte when the known field corresponds to a command field, or a single checksum byte when the known field corresponds to a checksum field.

In some examples, the instructions are further to cause the machine to determine that the message structure corresponds to a MODBUS protocol if the content of the message field of the process control message comprises at least one of: data associated with a start interval when the known field corresponds to a start interval, data associated with an end interval when the known field corresponds to an end interval, a function byte when the known field corresponds to a function field, or two cyclical redundancy check bytes when the known field corresponds to a cyclical redundancy check field. In some examples, the instructions are further to cause the machine to determine that the message structure corresponds to a Bristol Standard Asynchronous Protocol if the content of the message field of the process control message comprises at least one of: a data link escape byte when the known field corresponds to a data link escape field, a start text byte when the known field corresponds to a start text field, seven header bytes when the known field corresponds to a seven-byte header field, twelve header bytes when the known field corresponds to a twelve-byte header field, a second data link escape byte when the known field corresponds to a second data link escape field, an end text byte when the known field corresponds to an end text field, or two cyclical redundancy check bytes when the known field corresponds to a two-byte cyclical. In some examples, the instructions are further to cause the machine to determine that the message structure corresponds to one of a MODBUS protocol or a Bristol Standard Asynchronous Protocol if the content of the message field comprises two cyclical redundancy check bytes when the known field corresponds to a two-byte cyclical redundancy check field.

An example method includes detecting, with a logic circuit of a process control device having a first port connected to a first bus and a second port connected to a second bus, a first signal on the first port, the first port corresponding to a first modulation scheme and the second port corresponding to a second modulation scheme; determining, with the logic circuit, that the first signal received via the first port of the process control device is a first process control message that has a first message structure corresponding to a first process control message protocol of a plurality of process control message protocols; processing the first process control message according to the first process control message protocol; after processing the first process control message, determining, with the logic circuit, that a second process control message received via the second port does not conform to the first process control message protocol; in response to the determining that the second process control message does not conform to the first process control message protocol, determining, with the logic circuit, that the second process control message has a second message structure corresponding to a second process control message protocol different than the first process control message protocol; and processing the second process control message according to the second process control message protocol.

In some examples, the first process control message protocol corresponds to one of a Highway Addressable Remote Transducer protocol, a MODBUS protocol, or a Bristol Standard Asynchronous Protocol. In some examples, the method includes parsing the first process control message to identify a message field of the first process control message; and matching content of the message field to a known field of the first message structure corresponding to the first process control message protocol. In some examples, the method includes determining that the first message structure corresponds to a Highway Addressable Remote Transducer protocol if the content of the message field comprises between five and twenty preamble bytes, each preamble byte including a 0xff symbol when the message field corresponds to a preamble field. In some examples, the method includes determining that the first message structure corresponds to a Highway Addressable Remote Transducer protocol if the content of the message field comprises a delimiter byte when the message field corresponds to a delimiter field.

In some examples, the method includes determining that the first message structure corresponds to a Highway Addressable Remote Transducer protocol if the content of the message field comprises a five-byte address when the message field corresponds to an address. In some examples, the method includes determining that the first message structure corresponds to a Highway Addressable Remote Transducer protocol if the content of the message field comprises a command byte when the message field corresponds to a command field. In some examples, the method includes determining that the first message structure corresponds to a Highway Addressable Remote Transducer protocol if the content of the message field comprises a single checksum byte when the message field corresponds to a checksum field. In some examples, the method includes determining that the first message structure corresponds to a MODBUS protocol if the content of the message field comprises data associated with a start interval or an end interval when the message field corresponds to the start interval or the end interval.

In some examples, the method includes determining that the first message structure corresponds to a MODBUS protocol if the content of the message field comprises a function byte when the message field corresponds to a function field. In some examples, the method includes determining that the first message structure corresponds to a Bristol Standard Asynchronous Protocol if the content of the message field comprises seven or twelve header bytes when the message field corresponds to a seven-byte or a twelve-byte header field. In some examples, the method includes determining that the first message structure corresponds to a Bristol Standard Asynchronous Protocol if the content of the message field comprises a data link escape byte when the message field corresponds to a data link escape field.

In some examples, the method includes determining that the first message structure corresponds to the Bristol Standard Asynchronous Protocol if a second content of a second message field comprises a second data link escape byte when the message field corresponds to a second data link escape field. In some examples, the method includes determining that the first message structure corresponds to a Bristol Standard Asynchronous Protocol if the content of the message field comprises a start text byte when the message field corresponds to a start text field. In some examples, the method includes determining that the first message structure corresponds to a Bristol Standard Asynchronous Protocol if the content of the message field comprises an end text byte when the message field corresponds to an end text field. In some examples, the method includes determining that the first message structure corresponds to one of a MODBUS protocol or a Bristol Standard Asynchronous Protocol if the content of the message field comprises two cyclical redundancy check bytes when the message field corresponds to a two-byte cyclical redundancy check field. In some examples, the first port is configured to communicate over one of an RS485 bus or a Frequency Shift Keying bus, and the second port is configured to communicate over the other one of the RS485 bus or the Frequency Shift Keying bus.

An example apparatus includes a first port corresponding to a first modulation scheme; a second port corresponding to a second modulation scheme different than the first modulation scheme; a protocol detector to: detect a first signal on the first port and to determine that the first signal is a first process control message that has a first message structure corresponding to a first process control message protocol of a plurality of possible process control message protocols; determine that a second process control message received via the second port does not conform to the first process control message protocol; and in response to the determining that the second process control message does not conform to the first process control message protocol, determine that the second process control message has a second message structure corresponding to a second process control message protocol different than the first process control message protocol; and a processor to: process the first process control message according to the first process control message protocol; and process the second process control message according to the second process control message protocol.

In some examples, the first process control message protocol corresponds to one of a Highway Addressable Remote Transducer protocol, a MODBUS protocol, or a Bristol Standard Asynchronous Protocol. In some examples, the protocol detector is to determine that the first message structure of the first process control message corresponds to a Highway Addressable Remote Transducer protocol if a content of a message field of the first process control message comprises at least one of: between five and twenty preamble bytes, each preamble byte including a 0xff symbol, when the message field corresponds to a preamble field, a delimiter byte when the message field corresponds to a delimiter field, a five-byte address when the message field corresponds to an address, a command byte when the message field corresponds to a command field, or a single checksum byte when the message field corresponds to a checksum field. In some examples, the protocol detector is to determine that the first message structure of the first process control message corresponds to a MODBUS protocol if a content of a message field of the first process control message comprises at least one of: data associated with a start interval when the message field corresponds to the start interval, data associated with an end interval when the message field corresponds to the end interval, a function byte when the message field corresponds to a function field, or two cyclical redundancy check bytes when the message field corresponds to a cyclical redundancy check field.

In some examples, the protocol detector is to determine that the first message structure of the first process control message corresponds to a Bristol Standard Asynchronous Protocol if a content of a message field of the first process control message comprises at least one of: a data link escape byte when the message field corresponds to a data link escape field, a start text byte when the message field corresponds to a start text field, seven header bytes when the message field corresponds to a seven-byte header field, twelve header bytes when the message field corresponds to a twelve-byte header field, a second data link escape byte when the message field corresponds to a second data link escape field, an end text byte when the message field corresponds to an end text field, or two cyclical redundancy check bytes when the message field corresponds to a two-byte cyclical.

An example tangible machine readable storage medium comprising machine readable instructions, which when executed, cause a machine to at least: detect that a first signal is received on a first port of a process control device, the first port connected to a first bus and the process control device having a second port connected to a second bus, the first port corresponding to a first modulation scheme and the second port corresponding to a second modulation scheme; determine that the first signal received via the first port of the process control device is a first process control message that has a first message structure corresponding to a first process control message protocol of a plurality of process control message protocols; process the first process control message according to the first process control message protocol; after processing the first process control message, determine that a second process control message received via the second port does not conform to the first process control message protocol; in response to the determining that the second process control message does not conform to the first process control message protocol, determine that the second process control message has a second message structure corresponding to a second process control message protocol different than the first process control message protocol; and process the second process control message according to the second process control message protocol.

In some examples, the instructions are further to cause the machine to determine that the first message structure corresponds to a Highway Addressable Remote Transducer protocol if a content of a message field of the first process control message comprises at least one of: between five and twenty preamble bytes, each preamble byte including a 0xff symbol, when the message field corresponds to a preamble field, a delimiter byte when the message field corresponds to a delimiter field, a five-byte address when the message field corresponds to an address, a command byte when the message field corresponds to a command field, or a single checksum byte when the message field corresponds to a checksum field. In some examples, the instructions are further to cause the machine to determine that the first message structure corresponds to a MODBUS protocol if a content of a message field of the first process control message comprises at least one of: data associated with a start interval when the message field corresponds to a start interval, data associated with an end interval when the message field corresponds to an end interval, a function byte when the message field corresponds to a function field, or two cyclical redundancy check bytes when the message field corresponds to a cyclical redundancy check field.

In some examples, the instructions are further to cause the machine to determine that the first message structure corresponds to a Bristol Standard Asynchronous Protocol if a content of a message field of the first process control message comprises at least one of: a data link escape byte when the message field corresponds to a data link escape field, a start text byte when the message field corresponds to a start text field, seven header bytes when the message field corresponds to a seven-byte header field, twelve header bytes when the message field corresponds to a twelve-byte header field, a second data link escape byte when the message field corresponds to a second data link escape field, an end text byte when the message field corresponds to an end text field, or two cyclical redundancy check bytes when the message field corresponds to a two-byte cyclical.

In some examples, the instructions are further to cause the machine to determine that the first message structure corresponds to one of a MODBUS protocol or a Bristol Standard Asynchronous Protocol if a content of a message field comprises two cyclical redundancy check bytes when the message field corresponds to a two-byte cyclical redundancy check field.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
   a process control device including a port to be in communication with a bus, the process control device to receive a first signal at the port, prior to the first signal being received, the process control device not being configured to process signals according to any of a plurality of process control message protocols, the process control device including a protocol detector to compare the first signal to reference communication protocols to identify the first signal as being associated with a first communication protocol of the plurality of process control message protocols, in response to the process control device processing the first signal based on the first communication protocol, the process control device to generate a first outgoing message based on the first communication protocol, the first outgoing message being different from the first signal, the process control device to receive a second signal at the port, in response to the second signal being received, the process control device not being configured to process signals according to any of the plurality of process control message protocols, the protocol detector to compare the second signal to the reference communication protocols to identify the second signal as being associated with a second communication protocol of the plurality of process control message protocols, the first communication protocol being different than the second communication protocol, the process control device to process the second signal based on the second communication protocol, in response to the process control device processing the second signal based on the second communication protocol, the process control device to generate a second outgoing message based on the second communication protocol, the second outgoing message being different from the second signal.

2. The apparatus of claim 1, wherein the first communication protocol corresponds to one of a Highway Addressable Remote Transducer protocol, a MODBUS protocol, or a Bristol Standard Asynchronous Protocol.

3. The apparatus of claim 1, wherein the protocol detector is to 1) automatically compare the first signal to the reference communication protocols; and 2) automatically compare the second signal to the reference communication protocols.

4. The apparatus of claim 1, wherein, in response to the protocol detector not determining a first or second communication protocol, the process control device entering an initial state in which the process control device is not configured to process signals according to any of the plurality of process control message protocols.

5. The apparatus of claim 1, wherein the protocol detector is to compare the first signal to the reference communication protocols by identifying a match between the first communication protocol and the first signal.

6. The apparatus of claim 1, wherein the protocol detector is to compare the first signal to the reference communication protocols by identifying a dissimilarity between the first signal and communication protocols other than the first communication protocol.

7. The apparatus of claim 1, wherein the protocol detector is to compare the first signal to the reference communication protocols by determining if the first signal includes one or more of: 1) between five and twenty preamble bytes, each preamble byte including a 0xff symbol when a message field corresponds to a preamble field; 2) a delimiter byte when the message field corresponds to a delimiter field; 3) a five-byte address when the message field corresponds to an address; 4) a command byte when the message field corresponds to a command field; 5) a single checksum byte when the message field corresponds to a checksum field; 6) data associated with a start interval when the message field corresponds to a start interval; 7) data associated with an end interval when the message field corresponds to an end interval; 8) a function byte when the message field corresponds to a function field; 9) two cyclical redundancy check bytes when the message field corresponds to a cyclical redundancy check field; 10) a data link escape byte when the message field corresponds to a data link escape field; 11) a start text byte when the message field corresponds to a start text field; 12) seven header bytes when the message field corresponds to a seven-byte header field; 13) twelve header bytes when the message field corresponds to a twelve-byte header field; 14) a second data link escape byte when the message field corresponds to a second data link escape field; 15) an end text byte when the message field corresponds to an end text field; or 16) two cyclical redundancy check bytes when the message field corresponds to a two-byte cyclical redundancy check field.

8. A method, comprising:
receiving a first signal at a port of a process control device, prior to the first signal being received, the process control device not being configured to process signals according to any of a plurality of process control message protocols;
comparing the first signal to reference communication protocols to identify the first signal as being associated with a first communication protocol;
processing the first signal based on the first communication protocol;
generating a first outgoing message based on the first communication protocol, the first outgoing message being different from the first signal;
receiving a second signal at the port;

in response to receiving the second signal, initializing the process control device wherein the process control device is not configured to process signals according to any of the plurality of process control message protocols;
comparing the second signal to the reference communication protocols to identify the second signal as being associated with a second communication protocol, the first communication protocol being different than the second communication protocol;
processing the second signal based on the second communication protocol; and
generating a second outgoing message based on the second communication protocol, the second outgoing message being different from the second signal.

9. The method of claim 8, wherein the first communication protocol corresponds to one of a Highway Addressable Remote Transducer protocol, a MODBUS protocol, or a Bristol Standard Asynchronous Protocol.

10. The method of claim 8, wherein comparing the first signal to the reference communication protocols includes automatically comparing the first signal to the reference communication protocols, and comparing the second signal to the reference communication protocols includes automatically comparing the first signal to the reference communication protocols.

11. The method of claim 8, wherein, in response to the protocol detector not detecting a first or second communication protocol, the process control device entering an initial state in which the process control device is not configured to process signals according to any of the plurality of process control message protocols.

12. The method of claim 8, wherein comparing the first signal to reference communication protocols includes identifying a match between the first communication protocol and the first signal.

13. The method of claim 8, wherein comparing the first signal to the reference communication protocols includes identifying a dissimilarity between the first signal and communication protocols other than the first communication protocol.

14. The method of claim 8, wherein comparing the first signal to the reference communication protocols includes determining if the first signal includes one or more of: 1) between five and twenty preamble bytes, each preamble byte including a 0xff symbol when a message field corresponds to a preamble field; 2) a delimiter byte when the message field corresponds to a delimiter field; 3) a five-byte address when the message field corresponds to an address; 4) a command byte when the message field corresponds to a command field; 5) a single checksum byte when the message field corresponds to a checksum field; 6) data associated with a start interval when the message field corresponds to a start interval; 7) data associated with an end interval when the message field corresponds to an end interval; 8) a function byte when the message field corresponds to a function field; 9) two cyclical redundancy check bytes when the message field corresponds to a cyclical redundancy check field; 10) a data link escape byte when the message field corresponds to a data link escape field; 11) a start text byte when the message field corresponds to a start text field; 12) seven header bytes when the message field corresponds to a seven-byte header field; 13) twelve header bytes when the message field corresponds to a twelve-byte header field; 14) a second data link escape byte when the message field corresponds to a second data link escape field; 15) an end text byte when the message field corresponds to an end text field; or 16) two cyclical redundancy check bytes when the message field corresponds to a two-byte cyclical redundancy check field.

15. A tangible computer readable storage medium comprising instructions which, when executed, cause a machine to at least:
compare a first signal to reference communication protocols to identify the first signal as being associated with a first communication protocol, the first signal received at a port of a process control device, prior to receiving the first signal, the process control device not being configured to process signals according to any of a plurality of process control message protocols;
process the first signal based on the first communication protocol;
generate a first outgoing message based on the first communication protocol, the first outgoing message being different from the first signal;
compare a second signal to the reference communication protocols to identify the second signal as being associated with a second communication protocol, immediately prior to receiving the second signal, the process control device not being configured to process signals according to any of the plurality of process control message protocols, the second signal received at the port, the first communication protocol being different than the second communication;
process the second signal based on the second communication protocol; and
generate a second outgoing message based on the second communication protocol, the second outgoing message being different from the second signal.

16. The tangible computer readable storage medium of claim 15, wherein the first communication protocol corresponds to one of a Highway Addressable Remote Transducer protocol, a MODBUS protocol, or a Bristol Standard Asynchronous Protocol.

17. The tangible computer readable storage medium of claim 15, wherein instructions cause the machine to 1) compare the first signal to the reference communication protocols by automatically comparing the first signal to the reference communication protocols and 2) compare the second signal to the reference communication protocols by automatically comparing the first signal to the reference communication protocols.

18. The tangible computer readable storage medium of claim 15, wherein the instructions cause the machine to, in response to the protocol detector not determining a first or second communication protocol, the process control device entering an initial state in which the process control device is not configured to process signals according to any of the plurality of process control message protocols.

19. The tangible computer readable storage medium of claim 15, wherein the instructions cause the machine to compare the first signal to reference communication protocols by identifying a match between the first communication protocol and the first signal.

20. The tangible computer readable storage medium of claim 15, wherein the instructions cause the machine to compare the first signal to reference communication protocols by identifying a dissimilarity between the first signal and communication protocols other than the first communication protocol.

* * * * *

UNITED STATES PATENT AND TRADEMARK OFFICE
CERTIFICATE OF CORRECTION

PATENT NO. : 9,984,022 B2
APPLICATION NO. : 15/214387
DATED : May 29, 2018
INVENTOR(S) : Xuedong Liu Page 1 of 1

It is certified that error appears in the above-identified patent and that said Letters Patent is hereby corrected as shown below:

On the Title Page

In (54) in the Title of the Invention:
Replace "Method" with --Methods--.

Signed and Sealed this
Fourteenth Day of August, 2018

Andrei Iancu
*Director of the United States Patent and Trademark Office*